United States Patent [19]

Parsons et al.

[11] Patent Number: 4,839,039

[45] Date of Patent: * Jun. 13, 1989

[54] AUTOMATIC FLOW-CONTROL DEVICE

[75] Inventors: Natan E. Parsons, Brookline; Joel S. Novak, Sudbury, both of Mass.

[73] Assignee: Recurrent Solutions Limited Partnership, Cambridge, Mass.

[*] Notice: The portion of the term of this patent subsequent to Jun. 4, 2002 has been disclaimed.

[21] Appl. No.: 834,741

[22] Filed: Feb. 28, 1986

[51] Int. Cl.⁴ .................. B01D 36/00; E03C 1/05
[52] U.S. Cl. .................. 210/143; 4/623;
137/551; 137/599; 137/883; 251/129.04;
251/129.06; 222/52; 222/54; 222/189; 367/94;
210/251; 210/422; 210/433.1; 210/460
[58] Field of Search .................. 137/551, 599, 883;
4/623; 251/129.04, 129.06; 367/93, 94; 222/52,
54, 189; 210/143, 251, 418, 420, 422, 433.1, 435,
459, 460

[56] References Cited

U.S. PATENT DOCUMENTS

| 2,438,207 | 3/1944 | Derby .................. 112/316 |
| 2,507,966 | 8/1946 | Filliung, Jr. .................. 4/303 |
| 2,603,794 | 7/1952 | Bokser .................. 4/304 |
| 3,151,340 | 10/1964 | Teshima .................. 251/129.04 |
| 3,314,081 | 4/1967 | Atkins et al. .................. 4/304 |
| 3,406,941 | 10/1968 | Ichimori et al. .................. 251/129.01 |
| 3,575,640 | 4/1971 | Ishikawa .................. 4/304 |
| 3,638,680 | 2/1972 | Kopp .................. 137/606 |
| 3,639,920 | 2/1972 | Griffin et al. .................. 4/623 |
| 3,670,167 | 6/1972 | Forbes .................. 250/221 |
| 3,724,001 | 4/1973 | Ichimori et al. .................. 4/623 |
| 3,776,279 | 12/1973 | O'Connor, Jr. .................. 137/802 |
| 4,001,120 | 1/1977 | Gelman et al. .................. 210/420 |
| 4,141,091 | 2/1979 | Pulvari .................. 4/313 |
| 4,156,105 | 5/1979 | Wiesner et al. .................. 178/34 |
| 4,187,487 | 2/1980 | Numata et al. .................. 367/93 |
| 4,210,284 | 7/1980 | Tarnay et al. .................. 222/54 |
| 4,213,197 | 7/1980 | Magori .................. 367/94 |
| 4,229,811 | 10/1980 | Salem .................. 367/93 |
| 4,309,781 | 1/1982 | Lissau .................. 4/304 |
| 4,402,095 | 9/1983 | Pepper .................. 4/623 |
| 4,520,516 | 6/1985 | Parsons .................. 4/623 |

FOREIGN PATENT DOCUMENTS

| 205364 | 3/1956 | Australia . |
| 212396 | 7/1956 | Australia . |
| 466575 | 1/1974 | Australia . |
| 465881 | 3/1974 | Australia . |
| 2034877 | 12/1971 | Fed. Rep. of Germany . |
| 2755665 | 6/1978 | Fed. Rep. of Germany . |
| 2390657 | 12/1978 | France . |
| 2390741 | 12/1978 | France . |
| 2508210 | 12/1982 | France . |
| 55-40302 | 3/1980 | Japan .................. 251/129.04 |
| WO82/00727 | 3/1982 | PCT Int'l Appl. . |
| 1350246 | 7/1971 | United Kingdom . |

Primary Examiner—W. Gary Jones
Attorney, Agent, or Firm—Nutter, McClennen & Fish

[57] ABSTRACT

An add-on device (10) for converting a conventional manual faucet to an automatic faucet includes a body (12) that includes an adapter (14) by which the add-on device is mounted onto the outlet of the manual faucet. A conduit (32) provides a fluid path from the faucet outlet to a device outlet (18), and an electrically operable valve (30) is interposed in the conduit (32). A control circuit (26) operates an ultrasonic transducer (20) to sense objects in a target region near the device outlet 18, and it operates the valve (30) to permit water to flow out the device outlet (18) when the transducer detects a moving object in the target region.

36 Claims, 4 Drawing Sheets

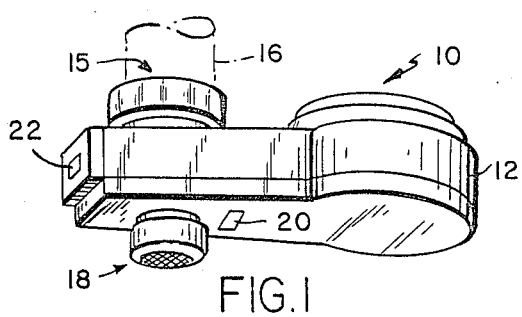
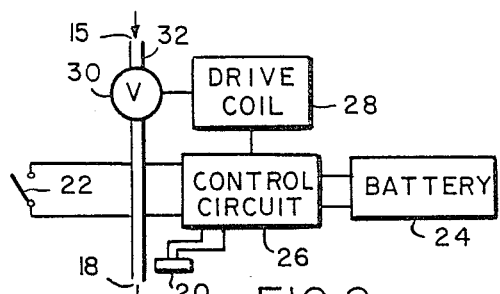
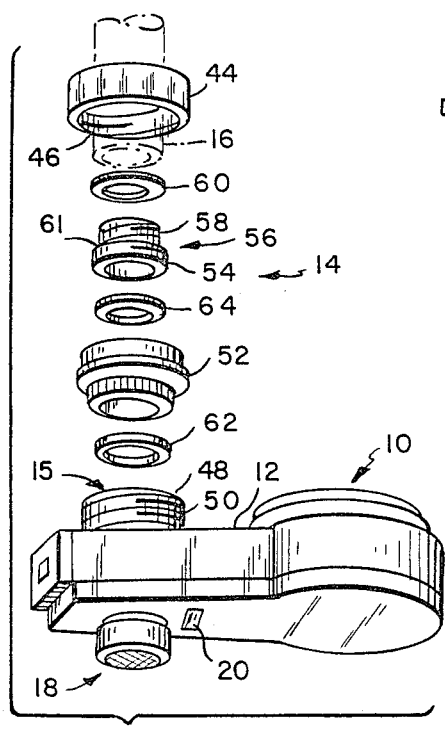
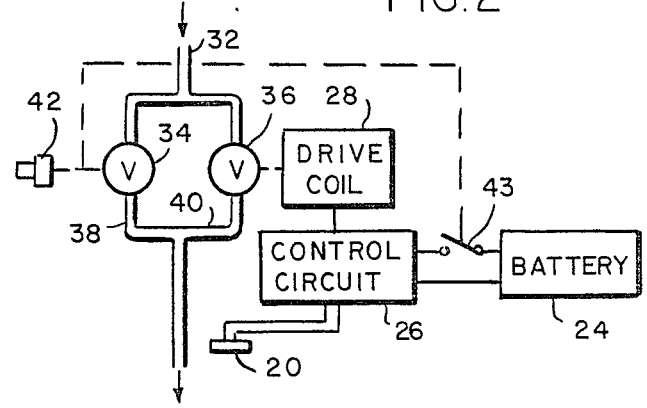
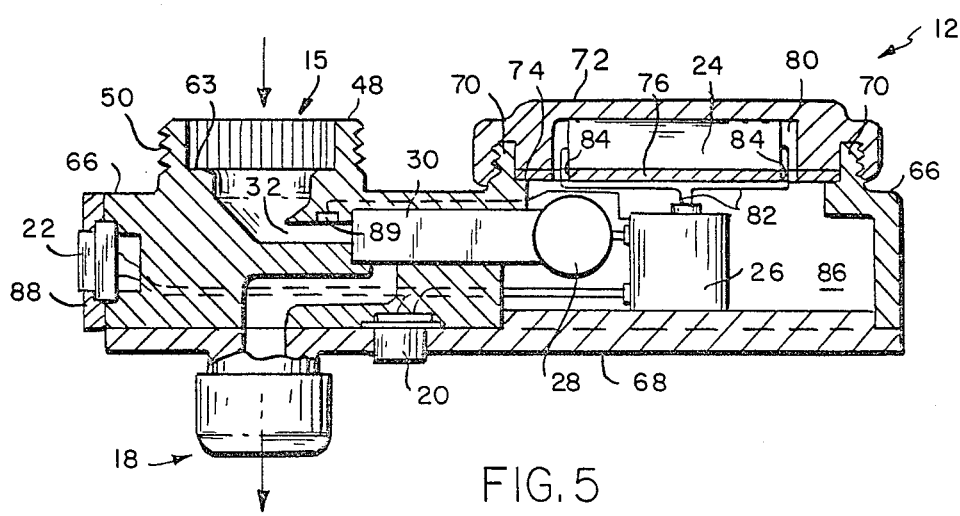

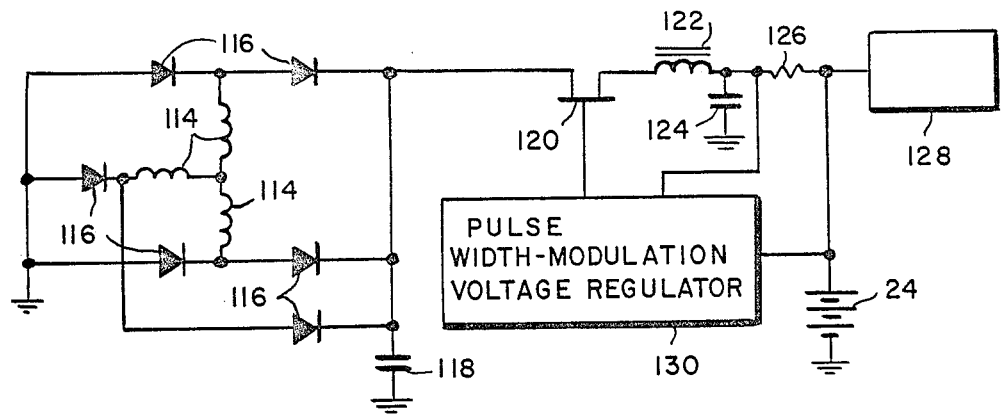
FIG.11
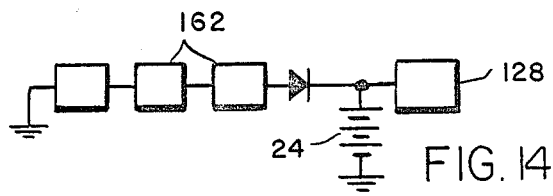
FIG.14
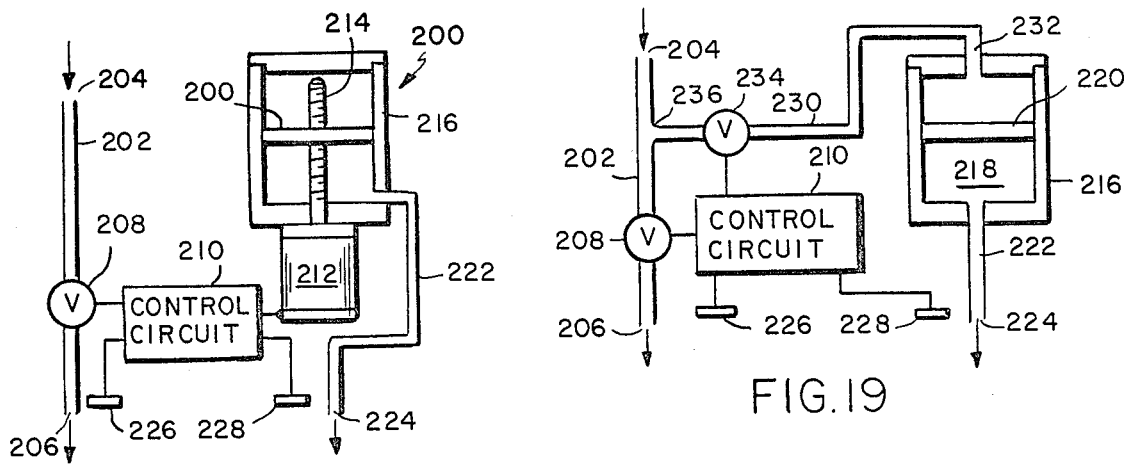
FIG.18
FIG.19
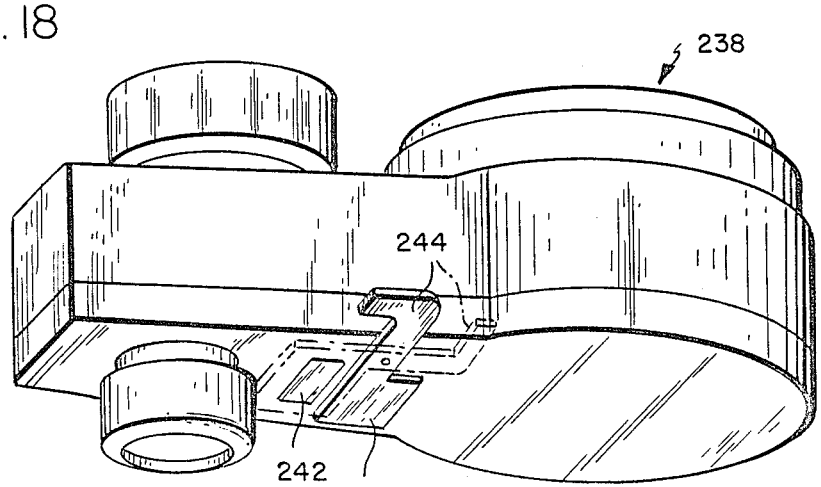
FIG.20

AUTOMATIC FLOW-CONTROL DEVICE

BACKGROUND OF THE INVENTION

The present invention is directed to devices for automatically controlling fluid flow. It has particular application to household uses, such as the control of water flow in a kitchen or bathroom sink or in a shower head, but it has related non-domestic uses.

Previously proposed automatic flow-control devices, such as the automatic faucet of U.S. Pat. No. 4,402,095 to Pepper, have certain disadvantages in the ordinary household environment. For example, most existing automatic faucets are no easier to install than conventional manual faucets are. This is a problem because most automatic faucets are to be installed in existing houses, not in new construction. Therefore, the homeowner is put to the added expense of hiring a plumber to replace the existing manual faucet with an automatic one unless he has the skill and the inclination to remove the existing faucet and install the new one.

Another problem is that currently available automatic faucets require power sources. In the context of existing construction, this means that the homeowner must employ not only a plumber but also an electrician if the power source is to be the ordinary household electrical circuit. The problem is aggravated in many cases because an electrical outlet is not located conveniently close to the faucet.

In the alternative, the power source could be carried on board the automatic faucet itself; for example, the faucet could include a battery pack. However, operation of the electrically operated valve can cause a significant power drain, and this can result in the need to replace batteries unacceptably often.

It is accordingly an object of one aspect of the present invention to simplify automatic-faucet installation. It is an object of another aspect of the present invention to reduce automatic-faucet power requirements.

SUMMARY OF THE INVENTION

Certain of the foregoing and related objects are achieved in an add-on device that is simply screwed on, or attached in some other similarly simple manner, to an existing manual faucet. The add-on device has an inlet, an outlet, and an internal conduit that leads from the inlet to the outlet. When the add-on device is screwed onto the faucet, the device inlet communicates with the faucet outlet, and a fluid path is thereby provided from the faucet to the outlet of the device. This path is controlled by an electrically operable valve interposed in the path, and a control circuit operates the valve in response to signals from a sensor, such as an ultrasonic transducer, that senses objects in a target region in the vicinity of the device. A seal is provided between the faucet and the add-on device so that when the manual faucet is in a position to permit water flow, flow is permitted or prevented by the control circuit in the device. With such a device, a homeowner can provide himself with an automatic-faucet capability without having to have the skill to install a faucet and without the need to dispose of a perfectly good manual faucet.

Others of the foregoing and related objects are achieved in an automatic faucet in which the electrically operable valve is a valve of the latching type, which requires power to change state—i.e., to go from closed to open or from open to closed—but not to remain in either state. Such an arrangement reduces the average power requirements of the valve and thus increases the length of time between battery replacements or allows battery replacement to be eliminated altogether.

BRIEF DESCRIPTION OF THE DRAWINGS

These and further features and advantages of the present invention are described in connection with the accompanying drawings, in which:

FIG. 1 is a isometric view of a flow-control device of the present invention;

FIG. 2 is a schematic diagram of the device of FIG. 1;

FIG. 3 is a schematic diagram of another embodiment of the device of FIG. 1;

FIG. 4 is an exploded view of the connector employed in the device of FIG. 1;

FIG. 5 is a cross-sectional view of the device of FIG. 1;

FIG. 11 is an electrical schematic of the generator and charging circuitry of the device of FIG. 6;

FIG. 14 is a schematic diagram of the charging circuitry of the embodiment of FIG. 13;

FIG. 18 is a schematic diagram of a soap-dispenser embodiment of the present invention;

FIG. 19 is a schematic diagram of another soap-dispenser embodiment; and

FIG. 20 is an isometric view of an alternate automatic-faucet embodiment.

DETAILED DESCRIPTION OF THE PREFERRED EMBODIMENTS

Figure 6:
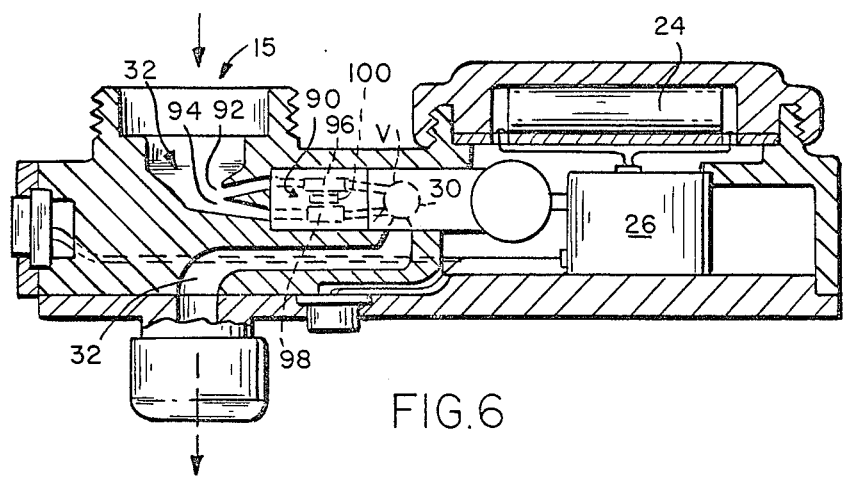
FIG. 6 is a cross-sectional view of an alternate embodiment of the flow-control device of the present invention.

FIG. 1 depicts an add-on flow-control device 10 for mounting on a faucet so as to control the flow of water through the faucet automatically. The housing 12 of the apparatus includes an connector 14 on its upper surface and surrounding a device inlet 15. The connector mounts the flow-control device 10 on a faucet 16 shown in phantom in FIG. 1. When the flow-control device allows water flow, the water flows in through the device inlet 15 and out its outlet 18. A sensor 20 senses objects in a target region, and related circuitry processes signals from the sensor 20 in order to determine whether to permit water flow.

The sensor 20 is typically an ultrasonic transducer that sends ultrasound into a target region and detects any resultant echoes, but other types of sensors, such as infrared, microwave, and capacitance-type sensors, can be used instead. For ultrasonic devices, we have used two ultrasonic piezoelectric transducers, one for transmission and the other for reception of the resulting echoes. As those skilled in the art will recognize, however, a single transducer can be used for both functions. The target region is typically a region under the outlet 18, where a device to be rinsed or container to be filled will be located. In some environments, however, such as in surgical scrub rooms, it may be preferable to locate the target region on a side where the likelihood is low that the region will ever be occupied by anything but the hand of a surgeon or nurse who wants to trigger water flow for a predetermined period of time.

A button 22 on the flow-control device 10 is employed by the user to indicate whether the faucet is to operate in a manual mode, in which the faucet is controlled manually and the flow-control device 10 permits whatever flow comes through the faucet, or in the automatic mode, in which the flow-control device controls the flow in accordance with the sensor signals.

FIG. 2 schematically depicts the internal mechanism of the flow-control device 10. A battery 24 powers a control circuit 26, which drives the sensor 20 and processes the echo signals that the sensor 20 receives. It further controls a drive coil 28, which operates a valve 30. The valve 30 controls the flow of water through a conduit 32, internal to the flow-control device 10, that provides fluid communication between the faucet 16 and the device outlet 18.

In the version illustrated in FIG. 2, the flowcontrol device 10 has a standby mode, in which the battery 24 supplies only enough power to sense whether the switch has been depressed; no object sensing occurs. In this mode, the valve 30 remains open until the user depresses the switch 22, at which time the circuit 26 commences an active mode, which will be discussed presently.

FIG. 3 depicts an alternate version, which does not require power when the flow-control device is in the standby mode. In FIG. 3, two valves 34 and 36 are disposed in two parallel fluid lines 38 and 40, respectively, into which the conduit 32 forks. A manually operable lever 42 operates valve 34 as well as a switch 43 that connects the battery 24 to the control circuit 26. In one position of the lever 42, valve 34 and switch 43 are both open, so the faucet operates in its manual mode, and the control circuit 26 is off. In its other position, valve 34 and switch 43 are both closed. If water is to flow, therefore, it must flow through line 40 and the other valve 36, which is under the control of the control circuit 26. Since switch 43 is now closed, the control circuit 26 receives power from the battery 24.

FIG. 4 shows the connector 14 in more detail. A cap 44 having internal threads 46 screws onto an externally threaded annular collar 48, which surrounds the device inlet 15 and is integral with the housing 12. The external threads 50 of collar 48 mate with the internal threads 46 of the cap 44. When the cap 44 is thus secured to the collar 48, it holds in place an adapter mounting ring 52, whose internal threads (not shown) mate with the set of external threads 54 on the larger-diameter portion of a two-diameter adapter 56. Adapter 56 is intended for internally threaded faucets; it has a second set of external threads 58 on its smaller-diameter part to mate with the internal threads of the faucet 16. If the flow-control device 10 is to be used on an externally threaded faucet, a different-shaped adapter is employed, but the adapter 56 is the only part of the connector that changes with the type of faucet.

To install the flow-control device 10 on the faucet 16, a washer 60 made of a resilient material such as rubber is placed on a shoulder 61 formed on the upper surface of the larger-diameter portion of adapter 56. The cap 44 is fitted around the end of the faucet 16, and the adapter 56 is screwed into the faucet 16, compressing the washer 60 between the adapter 60 and the faucet 16 to form a seal between them. Another resilient washer 62 is placed on an internal shoulder 63 (FIG. 4) inside collar 48, and a third resilient washer 64 is placed on an internal shoulder in the adapter mounting ring 52. The adapter mounting ring 52 is then screwed onto the adapter 56 to compress washer 64 and thereby form a seal between the adapter 56 and the adapter mounting ring 52. The cap 44 is then screwed onto the collar 48, and washer 62 is compressed between the mounting ring 52 and the shoulder 63 inside the collar 48. The flow-control device is thereby mounted on the faucet.

The internal mechanical arrangement of the flow-control device 10 is shown in FIG. 5. The housing 12 is shown in simplified form as including a body 66 to which is attached a bottom plate 68. The body 66 forms an externally threaded circular collar 70 on its upper surface, onto which is screwed a battery cap 72. A circular internal shoulder 74 formed in collar 70 supports a battery support plate 76, which in turn supports the battery 24, which is disposed in a chamber 80 formed by the support plate 76 and the internal surface of the battery cap 72. Leads 82 electrically connected to the battery 24 extend through holes 84 in the support plate 76 and are connected to the control circuit 26, which is located in a chamber 86 formed by the body 66, the battery support plate 76, and the bottom plate 68. The conduit 32 is formed in the body 66, which additionally provides a recess in which valve 30 is mounted. The body is shown for the sake of simplicity as a single piece but actually consists of two parts so that the conduit and recess can readily be formed by molding. A front plate 88 is secured to the body 66 and holds the switch assembly 22 in place.

In operation, the valve 30 is open when the faucet is to be manually controlled, and water flows whenever the faucet is turned on in the normal manner. To switch to automatic operation, the user turns the faucet manually to its on position, and water begins flowing. He then presses button 22. This causes an initialization process in the circuit 26, during which circuit 26 permits the valve 30 to remain open for a predetermined length of time. During this time, the user can adjust the water temperature. When the predetermined length of time is over, the circuit 26 causes the transducer to send pulses of ultrasound into the region beneath the device outlet 18 and sense the resultant echoes. If the resultant echoes indicate the presence of a target having predetermined characteristics—in the preferred embodiment, a moving target that produces echoes of at least a predetermined minimum intensity positioned in a predetermined target region below the outlet 18—then the control circuit 26 allows the valve 30 to remain open. Otherwise, it operates the coil 28 of the electrically operable valve 30 and thereby switches it to its closed state so that water flow stops. The valve 30 is of the magnetic latching type; it requires the application of power to switch it from one state to another, but it requires no power to keep it in either state.

The criteria for keeping the valve open may be different in different applications. A particularly advantageous basis on which to control the flow is to sense movement by making successive distance measurements. That is, an ultrasound pulse is sent into the target region, and the time between the transmission of the pulse and the first resultant echo of at least a predetermined minimum amplitude is measured. The process is then repeated, and if the difference between the two measurements is greater than another predetermined minimum, water is turned on because a moving object is present. Triggering water flow in response to moving objects is desirable because it avoids triggering by, for instance, a stationary stack of dishes. This criterion can be mixed with others. For example, the circuit could be configured to allow simple presence to trigger water flow if the object is close enough but to require motion when the object is farther away. Another criterion can be imposed in response to a thermocouple 89 disposed in the conduit 32 to measure the temperature of the water in it. The thermocouple 89 is connected electrically to the control circuit 26, which can be arranged to override other criteria and keep the valve 30 closed if the water is too hot. This prevents accidental scalding, and it is particularly advantageous in shower applications. Other criteria can also be imposed.

Transmission of pulses into the target region continues, and distance comparisons keep being made, so long as motion is detected. If no motion is detected, the control circuit 26 closes the valve, and water flow stops. If the absence of motion continues for more than about one minute, the circuit switches to a passive mode, in which the power applied to the transducer is much reduced. Provision of this mode helps conserve the energy in the battery 24; in one embodiment, the current drawn from a six-volt source is 70 microamperes, as opposed to the 300–400 microamperes that the circuit 26 draws in the active mode if it is not driving the valve coil 28. (In the standby mode, that embodiment draws 17 microamperes.)

In the passive mode, the transducer is driven with less power, and the circuitry detects only objects that are less than five centimeters (two inches) from the device outlet 18, so moving objects beyond that distance no longer cause water flow. However, the circuit responds to the presence of objects within that distance, and the user, upon noticing that the flow-control device 10 has converted to the passive mode, can convert it back to the active mode by placing an object into near proximity with the transducer 20 and then withdrawing it. When the user wants to convert back to the standby mode, on the other hand—i.e., back to manual operation—he presses button 22 again, and the valve 30 opens or remains open.

As can be inferred from the foregoing description, the arrangement of FIGS. 1–5 can be made to require very little power, so that battery can last for an extended period. Although the above-quoted rates of power consumption do not include the two amperes of current required for valve operation, the two amperes are required for only 5–10 msec. for each change of state, so the average power drawn by the valve is low. Valves of the magnetic-latching variety are commercially available from sources such as Skinner Valve Company of New Britain, Conn. We project that a single six-volt lithium battery can last for eighteen months in ordinary household kitchen use. Battery longevity could be considerably longer when the device is used in, for instance, a shower head.

In some applications, it may be preferred not to replace batteries even that often. The embodiment of FIGS. 6–12 is advantageous in such applications. FIG. 6 is a sectional view, similar to FIG. 5, of a similar flow-control device. In FIG. 6, parts corresponding to parts in FIG. 5 have the same reference numerals. A turbine-generator assembly 90 is interposed in the conduit 32 between the device inlet 15 and the valve 30 and is connected electrically to charging circuitry included, in this embodiment, in the control circuit 26.

The charging circuitry regulates charging of the battery 24, which in this embodiment is a rechargeable nickel-cadmium battery. Water flow through the flow-control device drives the generator, which powers the charging circuitry and thereby charges the battery 24. With this arrangement, the length of time between battery replacements is greatly extended. In some embodiments of the presesent invention, in fact, the battery can be eliminated entirely.

Figure 7:
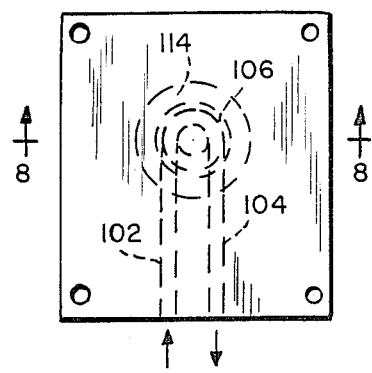
FIG. 7 is a plan view of the turbine-generator assembly of the device of FIG. 6.
Figure 8:
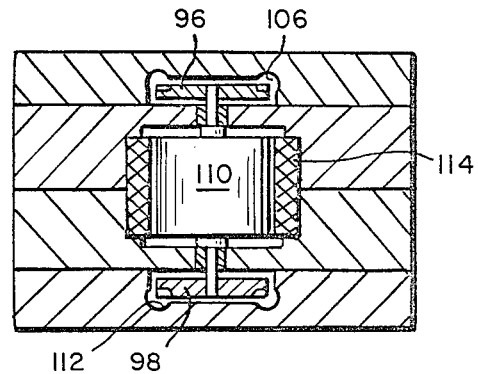
FIG. 8 is a cross-sectional view of the turbine-generator assembly taken at line 8—8 of FIG. 7.

In the FIG. 6 arrangement, the conduit 32 is divided into upper and lower channels 92 and 94, which divide the water flow between upper and lower turbine sections 96 and 98. These turbine sections drive a permanent-magnet rotor 100 of the turbine-generator assembly 90. As is best seen in FIGS. 7 and 8, channel 92 has two complementary portions 102 and 104 connected by an arcuate raceway 106, and the outer portion of the upper turbine section 96 is disposed in the raceway 106.

Figure 9:
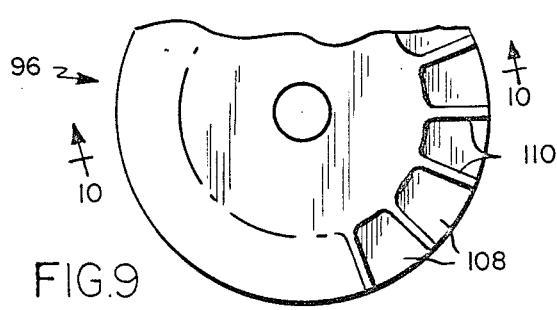
FIG. 9 is a plan view of the upper turbine section of the turbine-generator assembly of the device of FIG. 6.
Figure 10:
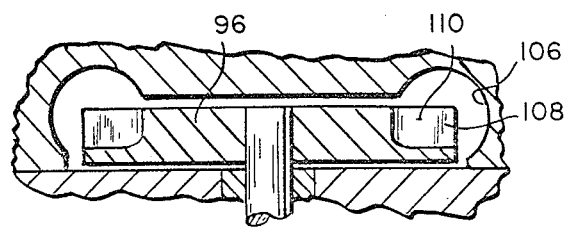
FIG. 10 is a cross-sectional view of the upper turbine section taken at line 10—10 of FIG. 9.

FIGS. 9 and 10 depict the upper turbine section 96. Together, these drawings show that the peripheral portion of the upper turbine section 96, i.e., the portion that is disposed in the raceway 106, has a number of relieved areas 108 that leave radially extending ridges 110 between them. The flow resistance provided by these ridges, and by the peripheral surface generally, causes the water flow to rotate turbine section 96 so that it drives the permanent-magnet rotor 100. A similar raceway 112 (FIG. 8) is provided for the lower turbine section 98 so that it aids in driving the rotor 100.

The use of a drag turbine is particularly advantageous in this application. Although, as a general proposition, axial-flow turbines have a higher potential efficiency, their efficiency is much more sensitive than that of a drag turbine is to the sizes of the gaps between their blades and the walls of the flow channel. By using a drag turbine, it is possible to obtain an acceptable level of efficiency without making the gap size so small as to produce reliability problems in a device intended for domestic use.

Rotation of the rotor 100 sets up varying magnetic-flux densities in the region occupied by generator windings 114 so that electromotive force is induced in those windings in the usual manner, and power is transferred to the charging section of circuit 26 when that circuit draws current in response. The relevant parts of the circuit 26 are depicted in schematic form in FIG. 11.

In FIG. 11, the windings 114 are shown connected in a wye configuration to rectifying diodes 116, through which the windings 114 charge a capacitor 118. The voltage on this capacitor is applied to the drain terminal of a field-effect transistor 120. The source terminal of transistor 120 is connected to a low-pass filter consisting of an inductor 122 and a capacitor 124. The output of this filter is applied through a current-limiting resistor 126 to the battery 24, whose voltage is in turn applied to the remainder 128 of the control circuit 26.

A voltage-regulating circuit 130 receives as inputs the voltages at both ends of the resistor 126. From these inputs, the sum of the currents drawn by the battery 24 and the remainder 128 of the circuit 26 can be inferred. In response to these, quantities, the voltage-regulating circuit 130 applies a signal to the gate terminal of transistor 120 to turn it on and off in such a manner as to pulse-width modulate the transistor current and thereby regulate the battery-charging current in the conventional manner.

Although the circuit of FIG. 11 includes the battery 24, it may be considered preferable in certain embodiments to dispense with the battery 24 altogether, relegating the task of energy storage primarily to capacitor 124. Such an arrangement would work best in an arrangement in which switching between manual and automatic operation occurs in a manner similar to that described in conection with FIG. 3, in which there is no standby mode to drain energy when the faucet is to be operated manually and in which water flows to charge capacitor 124 before the circuitry 26 requires power.

It is important that devices intended for home use be designed to require little or no maintenance. In this connection, it should be noted that the arrangement of FIG. 8 has its rotor and turbine journaled into the housing without seals. This is beneficial because rotating seals can be a source of maintenance problems. Seals are avoided in the embodiment of FIGS. 6–11 because the generator is submersible; water can be allowed into the generator. Specifically, for an approximately one-centimeter-diameter rotor magnet, a rotor-to-stator clearance of approximately 1.5 mm. has been left, in contrast to a more typical clearance in the range of 0.05–0.10 mm. The additional clearance is great enough to allow the generator to submerged in water without causing unacceptably high shear drag. Since a submersible generator does not require that water be excluded, rotating seals can be avoided, and this adds to the reliability of the device.

Figure 12:
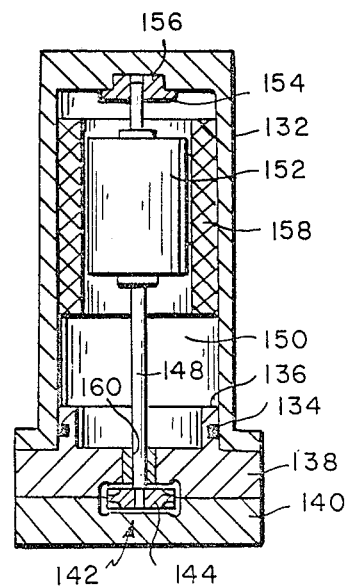
FIG. 12 is a cross-sectional view of an alternate arrangement of the turbine-generator assembly of the device of FIG. 6.

Rotating seals can also be avoided without using a submersible generator, as the arrangement of FIG. 12 illustrates. In that arrangement, a cylindrical upper housing 132 is sealed, by means of a resilient sealing ring 134 at the lower end of its inner surface, to the outer surface of a collar 136 formed on the upper surface of an upper base member 138. Together, the upper base member 138 and a lower base member 140 form a turbine chamber 142 in which a drag turbine 144 is mounted. The radially outermost portion of the chamber 142 forms a raceway 146, similar to raceway 106, through which water is directed to drive the turbine 144. The turbine 144 is mounted on a shaft 148 to drive it. The shaft 148 is journaled in the lower chamber wall and extends through the upper base member 138 into an air chamber 150 formed by housing 132 and the upper base member 138. From the air chamber 150, the shaft 148 extends through a permanent-magnet rotor 152, which is mounted on the shaft for rotation with it. The shaft 148 is journaled in a bearing 154 mounted in a recess 156 in the upper interior surface of the housing 132. The rotor 152 is disposed inside and concentric with stator windings 158, and it induces electromotive force in those windings 158 when it rotates.

The sealing ring 134 forms an air-tight seal between the housing 132 and the upper base member 138 so that the only path for entry of fluid into the air chamber 150 is the bore 160 through which the shaft 148 enters the chamber. If water enters the air chamber 150 through the bore 160, it will increase the air pressure in the chamber because the air, being lighter than water, cannot escape through the bore 160, and there is no other route by which it can escape. Therefore, only a small amount of water can enter the air chamber 150, and water cannot reach the generator parts, namely, the rotor 152 and the stator 158. This is achieved without using a submersible generator. However, the submersible generator has the advantage that it is not dependent on the orientation of the device, while the arrangement of FIG. 12 requires that the generator remain above the turbine.

Figure 13:
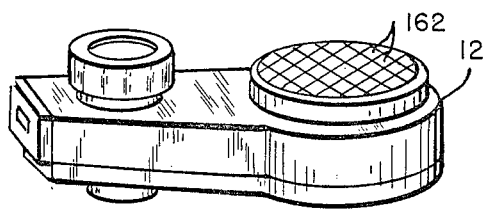
FIG. 13 is an isometric view of an embodiment of the flow-control device that employs solar cells as a power source.

A way to extend the time between battery changes while avoiding the moving turbine-generator parts is to use solar cells as the power source. In the arrangement of FIG. 13, solar cells 162 are arrayed on the upper surface of the housing 12. These solar cells are connected in series as depicted in FIG. 14, or alternatively in series-parallel, and the resulting combination is connected through a diode 164 across the battery 24. When light above a certain minimum intensity shines on the solar-cell array, the resulting voltage causes the battery to be charged. With this exception, the solar-cell arrangement of FIGS. 13 and 14 operates in a manner identical to that in which previous embodiments do.

Figure 15:
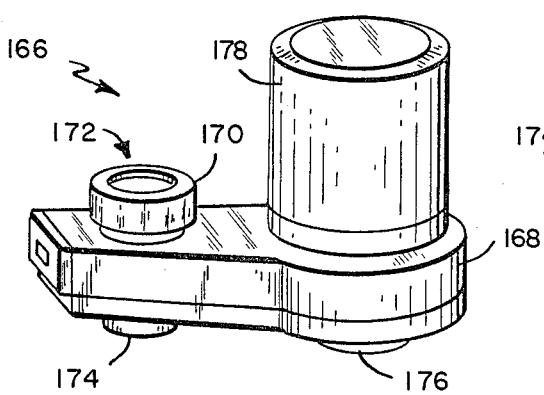
FIG. 15 is a isometric view of a water-filter embodiment of the present invention.

Certain of the teachings of the present invention are applicable to other types of add-on devices. For example, the water-filter device 166 illustrated in FIG. 15 automatically switches between filter and nonfilter functions. Its housing 168 has a connector 170 similar to connector 14 of FIG. 1 and similarly disposed around an inlet 172. Device 166 further has two outlets 174 and 176 and a filter housing 178 mounted on the main housing 168. The filter housing 178 houses a filter for filtering water that flows into the inlet 172. In one mode of operation of the water-filter device 166, water flows directly out through outlet 174 without flowing through the filter. In the other mode, the water flows through the filter and out through the other outlet 176.

Figure 16:
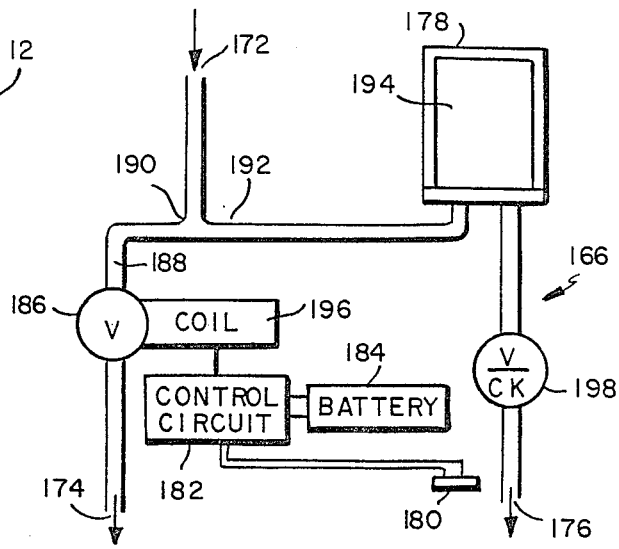
FIG. 16 is a schematic diagram of the device of FIG. 15.
Figure 17:
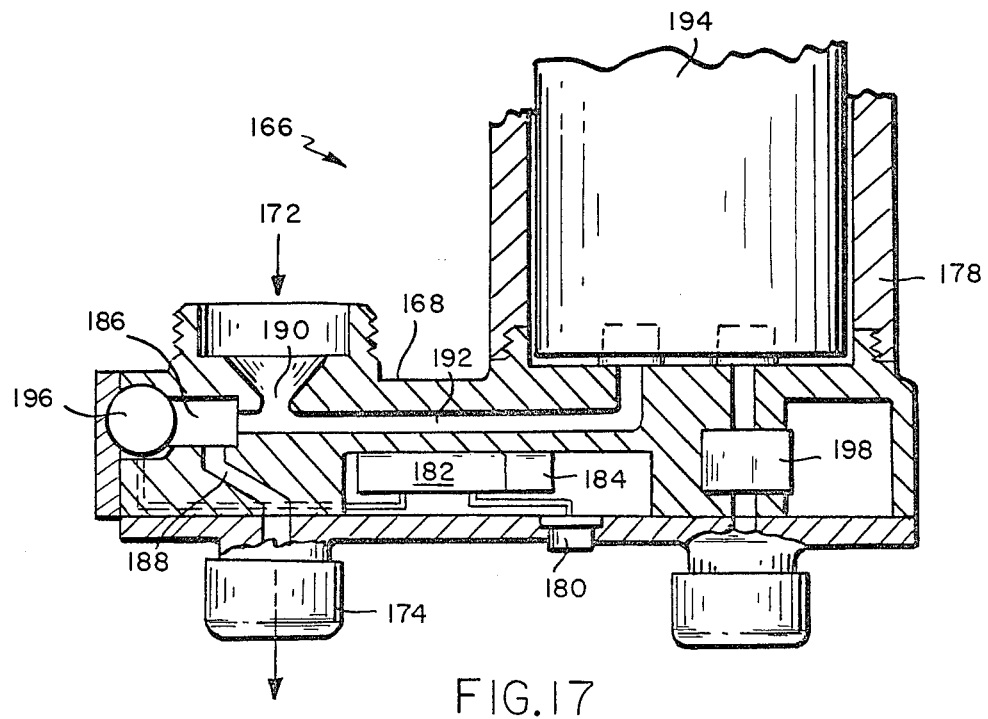
FIG. 17 is a cross-sectional view of the device of FIG. 15.

FIG. 16 depicts the water-filter device in schematic form, while FIG. 17 is a cross-sectional representation of it. An ultrasonic transducer 180 is disposed between the two outlets 174 and 176 but closer to the second outlet 176. This transducer is driven by a control circuit 182, which is shown as powered only by a battery 184 but which can, of course, be provided with the other sources of power mentioned above. The control circuit responds to transducer-detected echoes from objects in the target region by operating a valve 186 interposed in the conduit 188 that leads from the inlet 172 to the outlet 174.

In the absence of detected objects in the target region, valve 186 is in its open state, in which it permits water to flow through conduit 188. The resulting path from junction 190 to the outlet 174 is low enough in flow resistance that the pressure at the junction 190 is low. Another conduit 192 leads from the junction 190 to the second outlet 176, and the filter 194 is interposed in this conduit. Because of the low value of the pressure at the junction 190 and the relatively high flow resistance of the filter 194, the water is not driven up through conduit 192 and the filter 194. Therefore, water issues only from the first outlet 174.

When the transducer detects the presence of an object, such as a water glass, beneath the second outlet 176, it drives the drive coil 196 to cause the valve 186 to close. Upon closure of the valve 186, the pressure at the junction 190 rises to a level high enough to cause water to flow through conduit 192 and the filter 194 and out through the second outlet 176. Consequently, the water that issues from the filter device 166 is now filtered. When the object is thereafter removed, the transducer 180 no longer receives echoes of sufficient magnitude, and the control circuit responds by opening the valve 186, thereby lowering the pressure at the junction 190 and stopping the flow of water through the filter 194. A check valve 198 in the second conduit 192, which permits water flow from the filter 194 to the second outlet 176 when the valve 186 is closed, prevents water from leaking out the outlet in response to the lower pressure that prevails when valve 186 is open.

As was mentioned above, power sources other than the battery 184 can be used for the filter device 166. We believe that the turbine-generator arrangement without a battery is particularly well suited to filter-type devices. Since a user typically runs the water for a short period of time to allow it to cool before he fills his glass, there is time for the generator to charge up a capacitor before the circuit needs to sense a glass near the filter outlet. In fact, this could be a single-mode device that does not require the user to operate a button to turn it on and off.

Specifically, the user would initially open the manual faucet, and this would drive the generator to charge up the capacitor. As soon as the capacitor voltage reached a predetermined minimum, sensing would commence, and water would flow through the filter if an object were in close proximity to the filter outlet. Eventually, the user would turn off the faucet, so the generator would stop charging the capacitor. Sensing would continue until the capacitor voltage dropped below a predetermined minimum. Sensing would then stop until water flow again caused the generator to charge the capacitor to the predetermined minimum voltage. In the alternative, the circuit could be arranged to sense absence of generator voltage and to terminate sensing in response so that unnecessary energy use would be prevented.

Certain aspects of the invention can be embodied in other types of devices, too. FIGS. 18 and 19 schematically depict flow-control devices that additionally dispense soap. The soap-dispensing device 200 of FIG. 18 includes a conduit 202 for conducting fluid from its inlet 204 to its outlet 206. This conduit and the other elements shown schematically in FIG. 18 are contained in a housing (not shown) similar to the housings described above in connection with other embodiments; that is, they are contained in a housing that includes an adapter that mounts the device 200 on a faucet with inlet 204 in communication with the faucet outlet. An electrically operable valve 208 interposed in the conduit 202 controls the flow through the conduit 202 in response to signals applied by a control circuit 210. The control circuit also controls a motor 212, which drives a shaft 214 that extends into the interior of a soap container 216. The soap container is intended to contain soap in a lower region 218 of its interior, the lower region 218 being defined by a pressure plate 220 threadedly engaged by the shaft 214 so that rotation of the motor 212 raises and lowers the pressure plate 220. When the motor 212 lowers the pressure plate 220, it causes the soap in the container 216 to be squeezed through a conduit 222 and out a dispenser outlet 224.

The control circuit 210 drives two ultrasonic transducers 226 and 228 and controls the valve 208 and the motor 212 in response to the resultant echoes. Transducer 226 is so located and so operated as to sense objects in a target region near the water outlet 206, while transducer 228 is so located and operated as to sense objects in a target region near the soap outlet 224. The criteria for controlling water flow may, for example, be the same as those described in connection with the embodiment of FIGS. 1–5. For dispensing soap, those same criteria can also be used; a moved hand close to soap outlet 224 can cause soap to be dispensed. However, we believe that an advantageous criterion is mere presence of an object very close to the soap outlet 224.

In operation, a user places his hand beneath the soap outlet 224, and the circuitry senses the presence of the hand, drives the motor 212 for a predetermined duration, and then stops the motor 212. This causes the pressure plate to descend a small distance and thereby squeeze a small quantity of soap into the user's hand. When the pressure plate 220 stops, the soap stops, too, partly because the viscosity of the soap presents a relatively high resistance to flow and partly because the pressure plate 220 seals the lower region 218 against air from above the pressure plate 220 so that the soap is suspended by the pressure at the soap outlet 224. The user then moves his hands beneath the water outlet 206, and the control circuit 210 causes the valve 208 to open and permit water to flow into the user's hands. When the user removes his hands or stops moving them, the valve 208 closes, and the water stops.

An alternate soap-dispenser embodiment is depicted in FIG. 19, in which elements corresponding to those in FIG. 18 are given the same reference numerals. The arrangement of FIG. 19 differs in that the pressure plate 220 is driven by water pressure rather than by a motor. Specifically, a conduit 230 provides fluid communication between the device inlet 204 and an inlet 232 disposed in the container 216 above the pressure plate 220. A valve 234 is interposed in the conduit 230 between the device inlet 204 and the chamber inlet 232.

When the control circuit 210 determines that soap is to be dispensed, it opens valve 234 and keeps valve 208 closed so that a substantial pressure head remains at the junction 236 of the two conduits. This pressure is transmitted to the soap in the lower region 218 by the pressure plate 220. As a result, the soap is urged through the dispensing conduit 222 and out the soap-dispensing outlet 224. When the control circuit 210 subsequently closes valve 234, the pressure at the interface between the soap and the pressure plate 220 changes from positive to negative, and soap flow thereby stops.

Flow through the water outlet 206 is controlled as it is in the embodiment of FIG. 18.

A number of the devices described above are shown with a switch such as switch 22 for switching between manual and automatic operation. An alternative arrangement, which eliminates the need for a switch, is depicted in FIG. 20. The add-on device 238 of FIG. 20 is similar to device 10 of FIG. 1, but it has no switch corresponding to switch 22 of FIG. 1. Furthermore, it includes a flag 240, which is pivotably mounted on the lower surface adjacent to a transducer 242 corresponding to transducer 20 of FIG. 1. The flag 240 includes an arm 244 that can be employed by a user to pivot the flag 240 from the illustrated position to the position depicted in phantom, in which the flag is positioned about two-thirds of a centimeter (a quarter inch) from the sensor.

In the phantom position, the faucet is operated manually. It operates automatically when the flag is in the solid position.

The reason for this is that the criterion for water flow in the active mode is simple presence when the object is within five centimeters (two inches) of the sensor 242, although the criterion is object motion if the sensed object is farther from the sensor than that. If the sensed object is closer than five centimeters, the control circuitry keeps the valve open even if the object is stationary. Thus, even though the flag 236 is stationary, water flow is permitted whenever the flag is in the position depicted in phantom.

Despite this arrangement, the advantages of the passive mode are retained. Although the active mode uses simple presence rather than motion as the water-flow criterion in the first five centimeters of range, the control circuit still converts to the passive mode when a minute passes without motion detection, even if an object is within five centimeters of the sensor 242. That is, when the flag has been in the phantom-indicated position for a minute, the system converts to a its energy-conserving passive mode. Then, when the system in its passive mode no longer detects an object in the first five centimeters—i.e., when the flag 240 is pivoted to the illustrated position—the system converts back to the active mode.

This last effect, namely, the conversion to the active mode when the flag 240 is pivoted out of the way, is consistent with ordinary passive-mode operation. When the flag 240 is in the illustrated (automatic-operation) position and the device is in its passive mode, the device remains in its passive mode so long as no object is detected within five centimeters of the sensor 242. When the user wants the active mode to be restarted, he places, say, his hand in close proximity to the sensor 242. At this point, water starts flowing, but the device remains in the passive mode while the user's hand remains within the first five centimeters. When he removes his hand, the active mode commences.

From the foregoing description, it can be seen that the present invention provides significant advantages over existing devices. Because, in accordance with certain aspects of the invention, the existing faucet does not have to be replaced, waste is avoided. Furthermore, the add-on device is itself easily installed, so installation expense is also avoided. Finally, the use of a latching valve allows energy use to be kept to a minimum, and the length of time between battery changes can thereby be extended, or the battery can be eliminated altogether. The present invention thereby constitutes a significant advance in the art.

What is claimed as new and desired to be secured by Letters Patent of the United States is:

1. For controlling the flow of fluid through a faucet, a flow-control device comprising:
   A. a housing having a device inlet and a device outlet;
   B. a fluid conduit disposed in the housing for conducting fluid from the inlet to the outlet;
   C. mounting means on the housing for mounting the device on the faucet with the device inlet in fluid communication with the faucet outlet and the conduit disposed outside the faucet;
   D. sealing means for sealing the device inlet to the faucet outlet when the mounting means mounts the housing on the faucet so that fluid can flow from the faucet only by flowing through the flow-control device;
   E. an electric valve interposed in the conduit and operable by application of control signals thereto to switch between an open state, in which the valve permits fluid flow through the conduit, and a closed state, in which the valve prevents flow through the conduit;
   F. a sensor circuit for sensing the presence of objects in a target region near the device and for applying control signals to the valve to control flow of fluid through the conduit in response to at least one predetermined characteristic of the sensed object.

2. A flow-control device as defined in claim 1 wherein the sensor circuit includes means for, in at least one mode of operation, (A) applying control signals to the valve to cause the valve to assume its open state when the sensor circuit senses a moving object and (B) applying control signals to the valve to cause it to assume its closed state when the sensor circuit senses no moving object.

3. A flow-control device as defined in claim 2 wherein the sensor circuit comprises means for sensing object motion by sensing changes between the positions of sensed objects at discrete times.

4. A flow-control device as defined in claim 3 wherein the sensor circuit comprises means for sensing object motion by making successive measurements of the distance of a sensed object and concluding that motion has occurred if successive measurements differ by more than a predetermined minimum distance.

5. A flow-control device as defined in claim 1 wherein the conduit is the only fluid path therethrough, whereby closure of the valve prevents flow of fluid through the faucet.

6. A flow-control device as defined in claim 5 wherein the sensor circuit includes means for (A) in at least one mode of operation, applying control signals to the valve means to cause the valve means to assume its open state when the sensor circuit senses a moving object and (B) applying control signals to the valve to cause it to assume its closed state when the sensor circuit senses no moving object.

7. A flow-control device as defined in claim 6 wherein the sensor circuit comprises means for sensing object motion by sensing changes between the positions of sensed objects at discrete times.

8. A flow-control device as defined in claim 7 wherein the sensor circuit comprises means for sensing object motion by making successive measurements of the distance of a sensed object and concluding that motion has occurred if successive measurements differ by more than a predetermined minimum distance.

9. A flow-control device as defined in claim 1 wherein:
   A. the flow-control device further includes:
      i. a second outlet; and
      ii. a soap-dispensing mechanism in fluid communication with the second outlet for containing soap, the soap-dispensing mechanism being operable to dispense soap through the second outlet;
   B. the sensor circuit includes means for sensing the presence of objects in a dispenser target region and operating the soap-dispensing mechanism in response to at least one predetermined dispenser-control characteristic of the objects sensed in the dispenser target region.

10. A flow-control device as defined in claim 9 wherein:
    A. the soap dispenser includes:

i. a soap-containing chamber for containing soap and having a chamber inlet for admitting pressurized fluid into the chamber;

ii. a pressure plate, movably mounted in the chamber to divide the chamber into (a) a pressurized-fluid region including the chamber inlet and (b) a soap-containing region in communication with the second outlet, for urging the soap out the second outlet when pressure is applied to the pressure plate from the pressurized-fluid region;

iii. a dispenser conduit providing fluid communication between the device inlet and the chamber inlet;

iv. an electrically operable dispenser valve interposed in the dispenser conduit between the device inlet and the chamber inlet and operable by application of control signals thereto to switch between an open state, in which it permits fluid flow from the device inlet to the chamber inlet, and a closed position, in which it prevents such flow;

B. the sensor circuit includes means for applying control signals to the dispenser valve to cause it to open when it detects an object in the dispenser target region having the dispenser characteristic but to close when the sensor circuit detects no such object, whereby soap contained in the chamber will be urged out the dispenser outlet when the sensor circuit senses an object in the dispenser target region having the dispenser characteristic if a sufficient pressure head is present at the device inlet.

11. A flow-control device as defined in claim 9 wherein:

A. the soap dispenser includes:

i. a soap-containing chamber, in fluid communication with the second outlet, for containing soap;

ii. a pressure plate, movably mounted in the chamber, for urging the soap out the second outlet; and iii. a motor operatively connected to the pressure plate and operable by application of control signals thereto to urge the pressure plate against the soap in the chamber and thereby to urge soap out the second outlet; and B. the sensor circuit includes means for applying control signals to the motor to cause it to urge the pressure plate against the soap in the chamber when it detects an object in the dispenser target region having the dispenser characteristic but not to urge the pressure plate against the soap when it detects no such object, whereby soap contained in the chamber will be urged out the dispenser outlet when the sensor circuit senses an object in the dispenser target region having the dispenser characteristic.

12. A flow-control device as defined in claim 1 further including:

A. a turbine disposed in the conduit for driving of the turbine by flow of water through the conduit; and B. an electrical generator, connected to the turbine for driving thereby, for generating electric power when the turbine is driven by water flow, the generator being electrically connected to the sensor circuit to supply power thereto.

13. A flow-control device as defined in claim 12 wherein:

A. the flow-control device further includes an energy-storage circuit interposed between the generator and the sensor circuit for storing energy supplied by the generator and supplying the energy to the sensor circuit, the energy-storage circuit storing energy exclusively in one of (i) at least one capacitor, (ii) at least one inductor, and (iii) at least one capacitor and at least one inductor; and B. the generator and the energy-storage circuit are the exclusive sources of power to the sensor circuit.

14. A flow-control device as defined in claim 12 wherein the flow-control device further includes an energy-storage circuit including a rechargeable battery interposed between the generator and the sensor circuit for storing energy supplied by the generator and supplying the energy to the sensor circuit.

15. A flow control device as defined in claim 12 wherein:

A. the flow-control device further includes a generator housing that provides an air chamber that is substantially fluid tight above a lower generator level therin so as to prevent air from escaping from the chamber, the air chamber containing a volume of air above the lower generator level;

B. the generator is disposed in the air chamber above the lower generator level in the volume of air therein; and C. the turbine is disposed below the generator, whereby the generator is protected from water contact by the pressure of the air surrounding it.

16. A flow-control device as defined in claim 12 wherein the turbine is a drag turbine.

17. A flow-control device is defined in claim 12 wherein the generator is a submersible generator.

18. A flow-control device as defined in claim 1 wherein the valve is a latching valve, which requires power only to change state so that it remains in its open state when no power is applied to it in its open state, and it remains in its closed state when no power is applied to it in its closed state.

19. A flow-control device as defined in claim 1 wherein:

A. the sensor circuit comprises means for sensing objects by converting electrical power into sensing signals and for operating in at least two modes:

i. a first, active mode, in which the sensor circuit converts a first, relatively high average level of power into a sensor signal and senses objects throughout a first, relatively long, range; and ii. a second, passive mode, in which the sensor circuit converts a second, relatively low average level of power into a sensor signal and senses objects through a second, relatively short, range; and B. the sensor circuit comprises means for converting from the active mode to the passive mode when it has sensed no moving object having the predetermined characteristic for a predetermined length of time in the first range and for converting back to the active mode when it sense an object in the second range.

20. An automatic flow-control device comprising:

A. a fluid conduit, having an inlet and an outlet, for conducting fluid from its inlet to its outlet;

B. an electrical valve interposed in the conduit and operable by application of control signals thereto to switch between an open state, in which the valve permits fluid flow through the conduit, and a closed state, in which the valve prevents flow in the conduit;

C. a sensor circuit for sensing the presence of objects in a target region near the device outlet and for applying control signals to the valve to permit flow of fluid through the conduit in response to at least presence of an object within a predetermined presence-mode region within the target region; and D. a flag movably mounted for manual movement between an automatic position, in which it is disposed outside of the presence-mode region, and a manual position, in which it is disposed within the presence-mode region, whereby the valve permits fluid flow while the flag is in its manual position.

21. An automatic flow-control device as defined in claim 20 wherein the sensor circuit comprises means for applying control signals to the valve to permit flow of fluid through the conduit in response to motion but not presence alone in the target region outside of the presence-mode region.

22. An automatic flow-control device comprising:
A. a fluid conduit, having an inlet and an outlet, for conducting fluid from its inlet to its outlet;
B. an electric valve interposed in the conduit and operable by application of control signals thereto to switch between an open state, in which the valve permits fluid flow through the conduit, and a closed state, in which the valve prevents flow through the conduit;
C. a sensor circuit for sensing the presence of objects in a target region near the device outlet and for applying control signals to the valve means to control flow of fluid through the conduit in response to at least one predetermined characteristic of the sensed object; and
D. an electrical generator, electrically connected to the sensor circuit and adapted to be driven mechanically, for generating electric power when it is driven mechanically and applying the electric power to the sensor circuit; and
E. a drag turbine disposed in the conduit for driving of the turbine by flow of water through the conduit, the drag turbine being mechanically coupled to the generator to drive it mechanically when the drag turbine is driven by the water flow.

23. An automatic flow-control device comprising:
A. a fluid conduit, having an inlet and an outlet, for conducting fluid from its inlet to its outlet;
B. an electric valve interposed in the conduit and operable by application of control signals thereto to switch between an open state, in which the valve permits fluid flow through the conduit, and a closed state, in which the valve prevents flow through the conduit;
C. a sensor circuit for sensing the presence of objects in a target region near the device outlet and for applying control signals to the valve means to control flow of fluid through the conduit in response to at least one predetermined characteristic of the sensed object; and
D. solar cells, electrically connected to the sensor circuit, for converting light to electrical power and supplying the electrical power to the sensor circuit.

24. An automatic flow-control device comprising:
A. a fluid conduit, having an inlet and an outlet, for conducting fluid from its inlet to its outlet;
B. an electric valve interposed in the conduit and operable by application of control signals thereto to switch between an open state, in which the valve permits fluid flow through the conduit, and a closed state, in which the valve prevents flow through the conduit, the valve being a latching valve, which requires power only to change state so that it remains in its open state when no power is applied to it in its open state, and it remains in its closed state when no power is applied to it in its closed state; and
C. a sensor circuit for sensing the presence of objects in a target region near the device outlet and for applying control signals to the valve means to control flow of fluid through the conduit in response to at least one predetermined characteristic of the sensed object.

25. An automatic flow-control device comprising:
A. a fluid conduit, having an inlet and an outlet, for conducting fluid from its inlet to its outlet;
B. an electric valve interposed in the conduit and operable by application of control signals thereto to switch between an open state, in which the valve permits fluid flow through the conduit, and a closed state, in which the valve prevents flow through the conduit; and
C. a sensor circuit means for sensing objects in a target region by converting electric power into sensing signals and for applying control signals to the valve to control flow of fluid through the conduit in response to at least one characteristic of the sensed object, wherein the sensor circuit operates in at least two modes:
  i. a first, active mode, in which the sensor circuit means converts a first, relatively high average level of power into a sensor signal and senses objects throughout a first, relatively long range; and
  ii. a second, passive mode, in which the sensor circuit means converts a second, relatively low average level of power into a sensor signal and senses objects throughout a second, relatively short range; and
the sensor circuit means converts from the active mode to the passive mode when it has sensed the absence of an object having a first predetermined characteristic for a predetermined length of time in the first range and converts back to the active mode when it has sensed an object having a second predetermined characteristic in the second range.

26. An automatic flow-control device as defined in claim 25 wherein the sensor circuit means further comprises means for converting from the passive mode to the active mode upon sensing an object having the second predetermined characteristic in the second range and then sensing the absence of an object having the second predetermined characteristic in the second range.

27. An automatic flow-control device as defined in claim 25 wherein the sensor circuit means further comprises means for converting from the active mode to the passive mode when it has sensed the absence of an object having a first predetermined characteristic for a predetermined length of time in the first range and for converting back to the active mode upon sensing an object having a second predetermined characteristic, different from the first predetermined characteristic, in the second range and then sensing the absence of an object having the second predetermined characteristic in the second range.

28. An automatic flow-control device as defined in claim 25 wherein the sensor circuit means further comprises means for converting from the active mode to the passive mode when it has sensed the absence of a moving object for a predetermined length of time in the first range and for converting back to the active mode when it has sensed an object having a second predetermined characteristic in the second range and for converting from the passive mode to the active mode upon sensing any object in the second range and then sensing the absence of any object in the second range.

29. An automatic flow-control device as defined in claim 25 wherein the sensor circuit means further comprises means for converting from the active mode to the passive mode when it has sensed the absence of an object having a first predetermined characteristic for a predetermined length of time in the first range and for converting back to the active mode when it has sensed an object having a second predetermined characteristic, different from the first characteristic, in the second range.

30. An automatic flow-control device as defined in claim 25 wherein the sensor circuit means further comprises means for converting from the active mode to the passive mode when it has sensed the absence of a moving object for a predetermined length of time in the first range and for converting back to the active mode when it has sensed any object in the second range.

31. An automatic flow-control device comprising:
   A. a fluid conduit, having an inlet and an outlet, for conducting fluid from its inlet to its outlet;
   B. an electric valve interposed in the conduit and operable by application of control signals thereto to switch between an open state, in which the valve permits fluid flow through the conduit, and a closed state, in which the valve prevents flow through the conduit;
   C. a sensor circuit for sensing the presence of objects in a target region near the device outlet and for applying control signals to the valve means to control flow of fluid through the conduit in response to at least one predetermined characteristic of the sensed object;
   D. a generator housing that provides an air chamber that is substantially fluid tight above a lower generator level therein so as to prevent air from escaping from the chamber, the air chamber containing a volume of air above the lower generator level;
   E. an electrical generator, electrically connected to the sensor circuit and adapted to be driven mechanically, for generating electric power when it is driven mechanically and applying the electric power to the sensor circuit, the generator being disposed in the air chamber above the lower generator level in the volume of air therein; and
   F. a turbine disposed in the conduit for driving of the turbine by flow of water through the conduit, the turbine being mechanically coupled to the generator to drive it mechanically when the turbine is driven by the water flow, the turbine being disposed below the generator, whereby the generator is protected from water contact by the pressure of the air surrounding it.

32. An automatic flow-control device comprising:
   A. a fluid conduit, having an inlet and an outlet, for conducting fluid from its inlet to its outlet;
   B. an electric valve interposed in the conduit and operable by application of control signals thereto to switch between an open state, in which the valve permits fluid flow through the conduit, and a closed state, in which the valve prevents flow through the conduit;
   C. a sensor circuit for sensing the presence of objects in a target region near the device outlet and for applying control signals to the valve means to control flow of fluid through the conduit in response to at least one predetermined characteristic of the sensed object;
   D. a turbine disposed in the conduit for driving of the turbine of flow of water through the conduit; and
   E. a submersible electrical generator, mechanically connected to the turbine for driving thereby and electrically connected to the sensor circuit to supply power thereto, for generating electric power and applying the power to the sensor circuit when the turbine is driven by water flow.

33. For controlling the flow of fluid through a faucet, a flow-control device comprising:
   A. a housing having a device inlet and first and second device outlets;
   B. a first fluid conduit disposed in the housing for conducting fluid from the inlet to the outlet;
   C. a second fluid conduit disposed in the housing for conducting fluid from the inlet to the second device outlet;
   D. mounting means on the housing for mounting the device on the faucet with the device inlet in fluid communication with the faucet outlet;
   E. sealing means for sealing the device inlet to the faucet outlet when the mounting means mounts the housing on the faucet so that fluid can flow from the faucet only by flowing through the flow-control device;
   F. an electric valve interposed in the conduit and operable by application of control signals thereto to switch between an open state, in which the valve permits fluid flow through the first conduit, and a closed state, in which the valve prevents flow through the first conduit;
   G. a filter element interposed in the second conduit and presenting enough flow resistance so that fluid does not flow through the second conduit when the valve permits fluid flow in the first conduit, the filter element permitting fluid flow therethrough when the valve is closed so that filtered water flows through the second outlet; and
   H. a sensor circuit for sensing the presence of objects in the vicinity of the second outlet and to close the valve when it senses an object near the second outlet, the flow-control device thereby permitting flow of unfiltered water through the first-mentioned outlet when no object is sensed near the first outlet and directing fluid flow through the filter element so that filtered water issues through the second outlet when an object is near the second outlet.

34. A flow-control device as defined in claim 33 further including:
   A. a turbine disposed in the first conduit for driving of the turbine by flow of water through the conduit; and
   B. an electrical generator, connected to the turbine for driving thereby, for generating electric power when the turbine is driven by water flow, the generator being electrically connected to the sensor circuit to supply power thereto.

35. A flow-control device as defined in claim 34 wherein:
   A. the flow-control device further includes an energy-storage circuit interposed between the generator and the sensor circuit for storing energy supplied by the generator and supplying the energy to the sensor circuit, the energy-storage circuit storing energy exclusively in one of (i) at least one capacitor, (ii) at least one inductor, and (iii) at least one capacitor and at least one inductor; and
   B. the generator and the energy-storage circuit are the exclusive sources of power to the sensor circuit.

36. For controlling the flow of fluid through a faucet, a flow-control device comprising:
   A. a housing having a device inlet and a device outlet;
   B. a fluid conduit disposed in the housing for conducting fluid from the inlet to the outlet;
   C. mounting means on the housing for mounting the device on the faucet with the device inlet in fluid communication with the faucet outlet;
   D. sealing means for sealing the device inlet to the faucet outlet when the mounting means mounts the housing on the faucet so that fluid can flow from the faucet only by flowing through the flow-control device;
   E. an electric valve interposed in the conduit and operable by application of control signals thereto to switch between an open state, in which the valve permits fluid flow through the conduit, and a closed state, in which the valve prevents flow through the conduit;
   F. a sensor circuit for sensing the presence of objects in a target region near the device and for applying control signals to the valve to control flow of fluid through the conduit in response to at least one predetermined characteristic of the sensed object; and
   G. solar cells, electrically connected to the sensor circuit, for converting light to electrical power and supplying the electrical power to the sensor circuit.

* * * * *

REEXAMINATION CERTIFICATE (2225th)

United States Patent [19]
Parsons et al.

[11] B1 4,839,039

[45] Certificate Issued * Feb. 22, 1994

[54] AUTOMATIC FLOW-CONTROL DEVICE

[75] Inventors: Natan E. Parsons, Brookline; Joel S. Novak, Sudbury, both of Mass.

[73] Assignee: Recurrent Solutions Limited Partnership, Cambridge, Mass.

Reexamination Request:
No. 90/003,010, Apr. 5, 1993

Reexamination Certificate for:
Patent No.: 4,839,039
Issued: Jun. 13, 1989
Appl. No.: 834,741
Filed: Feb. 28, 1986

[*] Notice: The portion of the term of this patent subsequent to Jun. 4, 2002 has been disclaimed.

[51] Int. Cl.⁵ .................... B01D 36/00; E03C 1/05
[52] U.S. Cl. .................... 210/143; 4/623; 137/551; 137/599; 137/883; 251/129.04; 251/129.06; 222/52; 222/54; 222/189; 367/94; 210/251; 210/422; 210/433.1; 210/460
[58] Field of Search .......... 137/551, 599, 883; 4/623; 251/65, 129.04, 129.06; 367/93, 94; 222/52, 54, 189; 210/85, 94, 143, 251, 418, 420, 422, 433.1, 435, 459, 460, 90; 335/253, 254; 323/906; 136/291, 293

[56] References Cited

U.S. PATENT DOCUMENTS

| | | | |
|---|---|---|---|
| 2,359,048 | 9/1944 | Monroe | 237/10 |
| 2,370,038 | 2/1945 | Iglehart | 335/253 |
| 2,375,017 | 5/1945 | Marrison | 335/253 |
| 2,398,037 | 4/1946 | Quimper | 335/253 |
| 2,435,425 | 2/1948 | Cunningham | 335/253 |
| 2,441,633 | 5/1948 | Horman | 335/253 |
| 2,446,855 | 8/1948 | Seibel | 335/253 |
| 2,689,317 | 9/1954 | Timmerman | 335/253 |
| 3,022,450 | 2/1962 | Chase, Jr. | 335/253 |
| 3,070,730 | 12/1962 | Gray et al. | 335/253 |
| 3,206,656 | 9/1965 | Musgrave | 335/253 |
| 3,487,477 | 1/1970 | Classen | 4/623 |
| 3,821,967 | 7/1974 | Sturman et al. | 251/65 |
| 4,205,702 | 6/1980 | Silverwater | 210/90 |
| 4,256,133 | 3/1981 | Coward et al. | 137/624.11 |
| 4,541,563 | 9/1985 | Uetsuhara | 137/624.2 |
| 4,718,233 | 1/1988 | Barrett | 136/293 |

FOREIGN PATENT DOCUMENTS

52-31442  7/1977  Japan .................... 4/623

*Primary Examiner*—Joseph Drodge

[57] ABSTRACT

An add-on device (10) for converting a conventional manual faucet to an automatic faucet includes a body (12) that includes an adapter (14) by which the add-on device is mounted onto the outlet of the manual faucet. A conduit (32) provides a fluid path from the faucet outlet to a device outlet (18), and an electrically operable valve (30) is interposed in the conduit (32). A control circuit (26) operates an ultrasonic transducer (20) to sense objects in a target region near the device outlet 18, and it operates the valve (30) to permit water to flow out the device outlet (18) when the transducer detects a moving object in the target region.

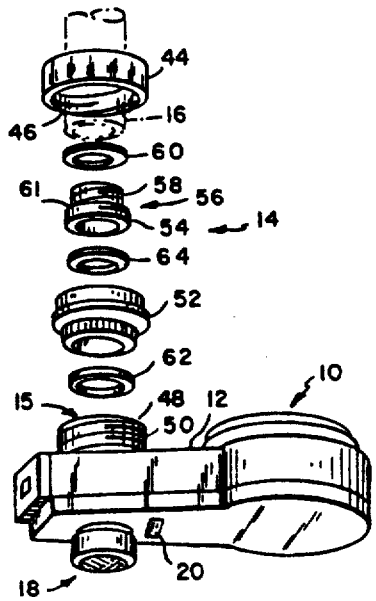

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25-30 is confirmed.

Claims 1, 2, 5, 9, 12, 19, 20, 22-24, 31-33 and 36 are determined to be patentable as amended.

Claims 3, 4, 6-8, 10, 11, 13-18, 21, 34 and 35, dependent on an amended claim, are determined to be patentable.

New claim 37 is added and determined to be patentable.

1. For controlling the flow of fluid through a faucet, a flow-control device comprising:
   A. a housing having a device inlet and a device outlet;
   B. a fluid conduit disposed in the housing for conducting fluid from the inlet to the outlet;
   C. mounting means on the housing for mounting the device on the faucet with the device inlet in fluid communication with the faucet outlet and the conduit disposed outside the faucet;
   D. sealing means for sealing the device inlet to the faucet outlet when the mounting means mounts the housing on the faucet so that fluid can flow from the faucet only by flowing through the flow-control device;
   E. an electric valve interposed in the conduit and operable by application of control signals thereto to switch between an open state, in which the valve permits fluid flow through the conduit, and a closed state, in which the valve prevents flow through the conduit;
   F. a sensor circuit *operable* for sensing the presence of objects in a target region near the device and for applying control signals to the valve to control flow of fluid through the conduit in response to at least one predetermined characteristic of the sensed object[.]; *and*
   G. *an electric-power source, mounted in the housing, for providing electric power to the electric valve and the sensor circuit.*

2. A flow-control device as defined in claim 1 or *or 37* wherein the sensor circuit includes means for, in at least one mode of operation, (A) applying control signals to the valve to cause the valve to assume its open state when the sensor circuit senses a moving object and (B) applying control signals to the valve to cause it to assume its closed state when the sensor circuit senses no moving object.

5. A flow-control device as defined in claim 1 or *37* wherein the conduit is the only fluid path therethrough, whereby closure of the valve prevents flow of fluid through the faucet.

9. A flow-control device as defined in claim 1 or *37* wherein:
   the flow-control device further includes:
   i. a second outlet; and
   ii. a soap-dispensing mechanism in fluid communication with the second outlet for containing soap, the soap-dispensing mechanism being operable to dispense soap through the second outlet;
   B. the sensor circuit includes means for sensing the presence of objects in a dispenser target region and operating the soap-dispensing mechanism in response to at least one predetermined dispenser-control characteristic of the objects sensed in the dispenser target region.

12. A flow-control device as defined in claim 1 or *37* further including:
   A. a turbine disposed in the conduit for driving of the turbine by flow of water through the conduit; and
   B. an electrical generator, connected to the turbine for driving thereby, for generating electric power when the turbine is driven by water flow, the generator being electrically connected to the sensor circuit to supply power thereto.

19. A flow-control device as defined in claim 1 or *37* wherein:
   A. the sensor circuit comprises means for sensing objects by converting electrical power into sensing signals and for operating in at least two modes:
   i. a first, active mode, in which the sensor circuit converts a first, relatively high average level of power into a sensor signal and senses objects throughout a first, relatively long, range; and
   ii. second, passive mode, in which the sensor circuit converts a second, relatively low average level of power into a sensor signal and senses objects through a second, relatively short, range; and
   B. the sensor circuit comprises means for converting from the active mode to the passive mode when it has sensed no moving object having the predetermined characteristic for a predetermined length of time in the first range and for converting back to the active mode when it [sense] *senses* an object in the second range.

20. An automatic flow-control device comprising:
   A. a fluid conduit, having an inlet and an outlet, for conducting fluid from its inlet to its outlet;
   B. an electrical valve interposed in the conduit and operable by application of control signals thereto to switch between an open state, in which the valve permits fluid flow through the conduit, and a closed state, in which the valve prevents flow in the conduit;
   C. a sensor circuit *operable* for sensing the presence of objects in a target region near the device outlet and for applying control signals to the valve to permit flow of fluid through the conduit in response to at least presence of an object within a predetermined presence-mode region within the target region; and
   D. a flag movably-mounted for manual movement between an automatic position, in which it is disposed outside of the presence-mode region, and a manual position, in which it is disposed within the presence-mode region, whereby the valve permits fluid flow while the flag is in its manual position.

22. An automatic flow-control device comprising:

A. a fluid conduit, having an inlet and an outlet, for conducting fluid from its inlet to its outlet;

B. an electric valve interposed in the conduit and operable by application of control signals thereto to switch between an open state, in which the valve permits fluid flow through the conduit, and a closed state, in which the valve prevents flow through the conduit;

C. a sensor circuit *operable* for sensing the presence of objects in a target region near the device outlet and for applying control signals to the valve means to control flow of fluid through the conduit in response to at least one predetermined characteristic of the sensed object; and D. an electrical generator, electrically connected to the sensor circuit and adapted to be driven mechanically, for generating electric power when it is driven mechanically and applying the electric power to the sensor circuit; and E. a drag turbine disposed in the conduit for driving of the turbine by flow of water through the conduit, the drag turbine being mechanically coupled to the generator to drive it mechanically when the drag turbine is driven by the water flow.

23. An automatic flow-control device comprising:

A. a fluid conduit, having an inlet and an outlet, for conducting fluid from its inlet to its outlet;

B. an electric valve interposed in the conduit and operable by application of control signals thereto to switch between an open state, in which the valve permits fluid flow through the conduit, and a closed state, in which the valve prevents flow through the conduit;

C. a sensor circuit *operable* for sensing the presence of objects in a target region near the device outlet and for applying control signals to the valve means to control flow of fluid through the conduit in response to at least one predetermined characteristic of the sensed object; and D. solar cells, electrically connected to the sensor circuit, for converting light to electrical power and supplying the electrical power to the sensor circuit.

24. An automatic flow-control device comprising:

A. a fluid conduit, having an inlet and an outlet, for conducting fluid from its inlet to its outlet;

B. an electric valve interposed in the conduit and operable by application of control signals thereto to switch between an open state, in which the valve permits fluid flow through the conduit, and a closed state, in which the valve prevents flow through the conduit, the valve being a latching valve, which requires power only to change state so that it remains in its open state when no power is applied to it in its open state, and it remains in its closed state when no power is applied to it in its closed state; and C. a sensor circuit *operable* for sensing the presence of objects in a target region near the device outlet and for applying control signals to the valve means to control flow of fluid through the conduit in response to at least one predetermined characteristic of the sensed object.

31. An automatic flow-control device comprising:

A. a fluid conduit, having an inlet and an outlet, for conducting fluid from its inlet to its outlet;

B. an electric valve interposed in the conduit and operable by application of control signals thereto to switch between an open state, in which the valve permits fluid flow through the conduit, and a closed state, in which the valve prevents flow through the conduit;

C. a sensor circuit *operable* for sensing the presence of objects in a target region near the device outlet and for applying control signals to the valve means to control flow of fluid through the conduit in response to at least one predetermined characteristic of the sensed object;

D. a generator housing that provides an air chamber that is substantially fluid tight above a lower generator level therein so as to prevent air from escaping from the chamber, the air chamber containing a volume of air above the lower generator level;

E. an electrical generator, electrically connected to the sensor circuit and adapted to be driven mechanically, for generating electric power when it is driven mechanically and applying the electric power to the sensor circuit, the generator being disposed in the air chamber above the lower generator level in the volume of air therein; and F. a turbine disposed in the conduit for driving of the turbine by flow of water through the conduit, the turbine being mechanically coupled to the generator to drive it mechanically when the turbine is driven by the water flow, the turbine being disposed below the generator, whereby the generator is protected from water contact by the pressure of the air surrounding it.

32. An automatic flow-control device comprising:

A. a fluid conduit, having an inlet and an outlet, for conducting fluid from its inlet to its outlet;

B. an electric valve interposed in the conduit and operable by application of control signals thereto to switch between an open state, in which the valve permits fluid flow through the conduit, and a closed state, in which the valve prevents flow through the conduit;

C. a sensor circuit *operable* for sensing the presence of objects in a target region near the device outlet and for applying control signals to the valve means to control flow of fluid through the conduit in response to at least one predetermined characteristic of the sensed object;

D. a turbine disposed in the conduit for driving of the turbine flow of water through the conduit; and E. a submersible electrical generator, mechanically connected to the turbine for driving thereby and electrically connected to the sensor circuit to supply power thereto, for generating electric power and applying the power to the sensor circuit when the turbine is driven by water flow.

33. For controlling the flow of fluid through a faucet, a flow-control device comprising:

A. a housing having a device inlet and first and second device outlets;

B. a first fluid conduit disposed in the housing for conducting fluid from the inlet to the outlet;

C. a second fluid conduit disposed in the housing for conducting fluid from the inlet to the second device outlet;

D. mounting means on the housing for mounting the device on the faucet with the device inlet in fluid communication with the faucet outlet;

E. sealing means for sealing the device inlet to the faucet outlet when the mounting means mounts the housing on the faucet so that fluid can flow from the faucet only by flowing through the flow-control device;

F. an electric valve interposed in the conduit and operable by application of control signals thereto to switch between an open state, in which the valve permits fluid flow through the first conduit, and a closed state, in which the valve prevents flow through the first conduit;

G. a filter element interposed in the second conduit andpresenting enough flow resistance so that fluid does not flow through the second conduit when the valve permits fluid flow in the first conduit, the filter element permitting fluid flow therethrough when the valve is closed so that filtered water flows through the second outlet; and H. a sensor circuit *operable* for sensing the presence of objects in the vicinity of the second outlet and to close the valve when it senses an object near the second outlet, the flow-control device thereby permitting flow of unfiltered water through the first-mentioned outlet when no object is sensed near the first outlet and directing fluid flow through the filter element so that filtered water issues through the second outlet when an object is near the second outlet.

36. For controlling the flow of fluid through a faucet, a flow-control device comprising:

A. a housing having a device inlet and a device outlet;

B. a fluid conduit disposed in the housing for conducting fluid from the inlet to the outlet;

C. mounting means on the housing for mounting the device on the faucet with the device inlet in fluid communication with the faucet outlet;

D. sealing means for sealing the device inlet to the faucet outlet when the mounting means mounts the housing on the faucet so that fluid can flow from the faucet only by flowing through the flow-control device;

E. an electric valve interposed in the conduit and operable by application of control signals thereto to switch between an open state, in which the valve permits fluid flow through the conduit, and a closed state, in which the valve prevents flow through the conduit;

F. a sensor circuit *operable* for sensing the presence of objects in a target region near the device and for applying control signals to valve to control flow of fluid through the conduit in response to at least one predetermined characteristic of the sensed object; and G. solar cells, electrically connected to the sensor circuit, for converting light to electrical power and supplying the electrical power to the sensor circuit.

37. *For controlling the flow of fluid through a faucet, a flow-control device comprising:*

*A. a housing having a device inlet and a device outlet;*

*B. a fluid conduit disposed in the housing for conducting fluid from the inlet to the outlet;*

*C. mounting means on the housing for mounting the device on the faucet with the device inlet in fluid communication with the faucet outlet and the conduit disposed outside the faucet;*

*D. sealing means for sealing the device inlet to the faucet outlet when the mounting means mounts the housing on the faucet so that fluid can flow from the faucet only by flowing through the flow-control device;*

*E. an electric valve interposed in the conduit and operable by application of control signals thereto to switch between an open state, in which the valve permits fluid flow through the conduit, and a closed state, in which the valve prevents flow through the conduit, the valve being a latching valve, which requires power only to change state so that it remains in its open state when no power is applied to it in its open state and it remains in its closed state when no power is applied to it in its closed state; and*

*F. a sensor circuit operable for sensing the presence of objects in a target region near the device outlet and for applying control signals to the valve to control flow of fluid through the conduit in response to at least one predetermined characteristic of the sensed object.*

* * * * *

REEXAMINATION CERTIFICATE (3692nd)

United States Patent [19]

Parsons et al.

[11] B2 4,839,039
[45] Certificate Issued Dec. 29, 1998

[54] AUTOMATIC FLOW-CONTROL DEVICE

[75] Inventors: Natan E. Parsons, Brookline; Joel S. Novak, Sudbury, both of Mass.

[73] Assignee: Recurrent Solutions Limited Partnership, Cambridge, Mass.

Reexamination Requests:
No. 90/003,323, Jan. 24, 1994
No. 90/003,635, Nov. 10, 1994

Reexamination Certificate for:
Patent No.: 4,839,039
Issued: Jun. 13, 1989
Appl. No.: 834,741
Filed: Feb. 28, 1986

Reexamination Certificate B1 4,839,039 issued Feb. 22, 1994

[51] Int. Cl.$^6$ .................. B01D 36/00; E03C 1/05
[52] U.S. Cl. .................. 210/143; 4/623; 137/551; 137/599; 137/883; 210/251; 210/422; 210/433.1; 210/460; 222/52; 222/54; 222/189.06; 251/129.04; 251/129.06; 367/94
[58] Field of Search ................ 4/623, 668; 137/551, 137/599, 883; 210/143, 251, 418, 420, 422, 433.1, 435, 459, 460; 222/52, 54, 189, 61; 251/65, 129.04, 129.05, 129.06, 129.01; 320/61; 307/66; 136/243, 291

[56] References Cited

U.S. PATENT DOCUMENTS

| | | |
|---|---|---|
| 3,022,450 | 2/1962 | Chase, Jr. . |
| 3,379,214 | 4/1968 | Weinberg ............................ 251/65 |
| 3,487,477 | 1/1970 | Classen ............................... 4/623 |
| 3,639,920 | 2/1972 | Griffin et al. ....................... 4/623 |
| 3,799,198 | 3/1974 | Kijimoto ........................ 137/624.11 |
| 3,814,376 | 6/1974 | Reinicke . |
| 3,821,967 | 7/1974 | Sturman et al. ................ 137/624.15 |
| 3,863,196 | 1/1975 | Hilles ................................. 4/302 |
| 4,107,046 | 8/1978 | Corder ........................... 210/433.1 |
| 4,402,095 | 9/1983 | Pepper ................................ 4/623 |
| 4,520,516 | 6/1985 | Parsons .............................. 4/623 |
| 4,645,094 | 2/1987 | Acklin et al. . |
| 4,651,777 | 3/1987 | Hardman ........................... 4/623 |
| 4,826,129 | 5/1989 | Fong et al. ................... 251/129.04 |
| 4,839,039 | 6/1989 | Parsons et al. ................ 210/143 |

FOREIGN PATENT DOCUMENTS

| | | |
|---|---|---|
| 844007930 | 12/1990 | European Pat. Off. . |
| 901132019 | 12/1990 | European Pat. Off. . |
| 849035894 | 2/1991 | European Pat. Off. . |
| 99973 | 11/1895 | Germany . |
| 25 33 527 | 1/1977 | Germany ........................... 4/623 |
| 2533527 | 1/1977 | Germany . |
| 50-68824 | 6/1975 | Japan . |
| 52-31442 | 7/1977 | Japan . |
| 55-40302 | 3/1980 | Japan ........................ 251/129.04 |
| 58-28075 | 2/1983 | Japan ........................ 251/129.04 |
| 58-28076 | 2/1983 | Japan ........................ 251/129.04 |
| 59-126183 | 7/1984 | Japan ................................ 4/623 |
| 504185 | 4/1939 | United Kingdom . |
| 876370 | 8/1961 | United Kingdom . |
| 949603 | 2/1964 | United Kingdom . |
| 1147663 | 5/1966 | United Kingdom . |
| 1189626 | 4/1970 | United Kingdom . |
| 2076117 | 11/1981 | United Kingdom . |

*Primary Examiner*—Joseph Drodge

[57] ABSTRACT

An add-on device (10) for converting a conventional manual faucet to an automatic faucet includes a body (12) that includes an adapter (14) by which the add-on device is mounted onto the outlet of the manual faucet. A conduit (32) provides a fluid path from the faucet outlet to a device outlet (18), and an electrically operable valve (30) is interposed in the conduit (32). A control circuit (26) operates an ultrasonic transducer (20) to sense objects in a target region near the device outlet 18, and it operates the valve (30) to permit water to flow out the device outlet (18) when the transducer detects a moving object in the target region.

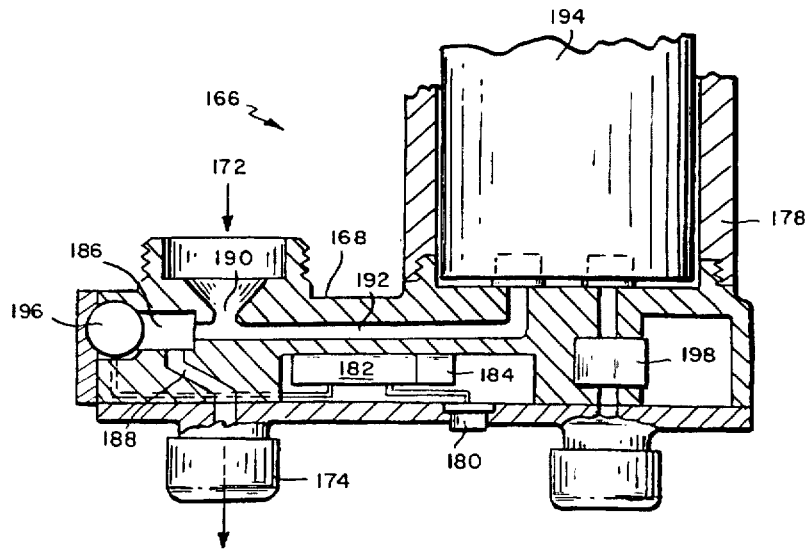

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 22 and 31–35 is confirmed.

Claims 12, 19, 21, 23 and 36 are cancelled.

Claims 1,13–17, 20, 24, 25 and 37 are determined to be patentable as amended.

Claims 2–11, 18 and 26–30, dependent on an amended claim, are determined to be patentable.

New claims 38 and 39 are added and determined to be patentable.

1. For controlling the flow of fluid through a faucet, a flow-control device comprising:
   A. a housing *sized to be supported by the faucet* having a device inlet and a device outlet;
   B. a fluid conduit disposed in the housing for conducting fluid from the inlet to the outlet;
   C. mounting means on the housing for mounting the device on the faucet with the device inlet in fluid communication with the faucet outlet and the conduit disposed outside the faucet;
   D. sealing means for sealing the device inlet to the faucet outlet when the mounting means mounts the housing on the faucet so that fluid can flow from the faucet only by flowing through the flow-control device;
   E. an electric valve interposed in the conduit and operable by application of control signals thereto to switch between an open state, in which the valve permits fluid flow through the conduit, and a closed state, in which the valve prevents flow through the conduit;
   F. a sensor circuit operable for sensing the presence of objects in a target region near the device and for applying control signals to the valve to control flow of fluid through the conduit in response to at least one predetermined characteristic of the sensed object; and
   G. [an electric-power source] *a battery,* mounted in the housing[.] *and sized to be contained completely therein* for providing electric power to the electric valve and the sensor circuit, *the sensor circuit, valve, and battery being arranged, and/or the device comprising means, for limiting power requirements of at least one of the valve and sensor circuit so as to extend the life of the battery.*

13. A flow-control device as defined in claim [12] *38 or 39* wherein:
   A. the flow-control device further includes an energy-storage circuit interposed between the generator and the sensor circuit for storing energy supplied by the generator and supplying the energy to the sensor circuit, the energy-storage circuit storing energy exclusively in one of (i) at least one capacitor, (ii) at least one inductor, and (iii) at least one capacitor and at least one inductor; and
   B. the generator and the energy-storage circuit are the exclusive sources of power to the sensor circuit.

14. A flow-control device as defined in claim [12] *38 or 39* wherein the flow-control device further includes an energy-storage circuit including a rechargeable battery interposed between the generator and the sensor circuit for storing energy supplied by the generator and supplying the energy to the sensor circuit.

15. A flow control device as defined in claim [12] *38 or 39* wherein:
   A. the flow-control device further includes a generator housing that provides an air chamber that is substantially fluid tight above a lower generator level therein so as to prevent air from escaping from the chamber, the air chamber containing a volume of air above the lower generator level;
   B. the generator is disposed in the air chamber above the lower generator level in the volume of air therein; and
   C. the turbine is disposed below the generator, whereby the generator is protected from water contact by the pressure of the air surrounding it.

16. A flow-control device as defined in claim [12] *38 or 39* wherein the turbine is a drag turbine.

17. A flow-control device as defined in claim [12] *38 or 39* wherein the generator is a submersible generator.

20. An automatic flow-control device comprising:
   A. a fluid conduit, having an inlet and an outlet, for conducting fluid from its inlet to its outlet;
   B. an electrical valve interposed in the conduit and operable by application of control signals thereto to switch between an open state, in which the valve permits fluid flow through the conduit, and a closed state, in which the valve prevents flow in the conduit;
   C. a sensor circuit for sensing the presence of objects in a target region near the device outlet and for applying control signals to the valve to permit flow of fluid through the conduit in response to at least presence of an object within a predetermined presence-mode region within the target region, *the sensor circuit comprising means for applying control signals to the valve to permit flow of fluid through the conduit in response to motion but not presence alone in the target region outside of the presence-mode region;* and
   D. a flag movably mounted for manual movement between an automatic position, in which it is disposed outside of the presence-mode region, and a manual position, in which it is disposed within the presence-mode region, whereby the valve permits fluid flow while the flag is in its manual position.

24. An automatic flow-control device comprising:
   A. a fluid conduit, having an inlet and an outlet, for conducting fluid from its inlet to its outlet;
   B. an electric valve interposed in the conduit and operable by application of control signals thereto to switch between an open state, in which the valve permits fluid flow through the conduit, and a closed state, in which the valve prevents flow through the conduit, the valve being a latching valve, which requires power only to change state so that it remains in its open state when no power is applied to it in its open state, and it remains in its closed state when no power is applied to it in its closed state; [and]

C. a sensor circuit operable for sensing the presence of objects in a target region near the device outlet and for applying control signals to the *latching* valve [means] to control flow of fluid through the conduit in response to at least one predetermined characteristic of the sensed object; *and*

D. *a battery for providing power to the electric valve and the sensor circuit, the sensor circuit, valve and battery being arranged, and/or the device comprising means, for limiting power requirements of at least one of the valve and sensor circuit so as to extendd the life of the battery.*

25. An automatic flow-control device comprising:

A. a fluid conduit, having an inlet and an outlet, for conducting fluid from its inlet to its outlet;

B. an electric valve interposed in the conduit and operable by application of control signals thereto to switch between an open state, in which the valve permits fluid flow through the conduit, and a closed state, in which the valve prevents flow through the conduit; and C. a sensor circuit means for sensing objects in a target region by converting electric power into sensing signals and for applying control signals to the valve to control flow of fluid through the conduit in response to at least one characteristic of the sensed object, wherein the sensor circuit operates in at least two modes;

i. a first, active mode, in which the sensor circuit means converts a first, relatively high average level of power into a sensor signal and senses objects throughout a first, relatively long range; and ii. a second, passive mode, in which the sensor circuit means converts a second, relatively low average level of power into a sensor signal and senses objects throughout a second, relatively short range; and the sensor circuit means [converts] *comprises circuitry for converting* from the active mode to the passive mode when it has sensed the absence of an object having a first predetermined characteristic for a predetermined length of time in the first range and [converts] *for converting* back to the active mode when it has sensed an object having a second predetermined characteristic in the second range.

37. For controlling the flow of fluid through a faucet, a flow-control device comprising:

A. a housing having a device inlet and a device outlet;

B. a fluid conduit disposed in the housing for conducting fluid from the inlet to the outlet;

C. mounting means on the housing for mounting the device on the faucet with the device inlet in fluid communication with the faucet outlet and the conduit disposed outside the faucet;

D. sealing means for sealing the device inlet to the faucet when the mounting means mounts the housing on the faucet so that fluid can flow from the faucet only by flowing through the flow-control device;

E. an electric valve interposed in the conduit and operable by application of control signals thereto to switch between an open state, in which the valve permits fluid flow through the conduit, and a closed state, in which the valve prevents flow through the conduit, the valve being a latching valve, which requires power only to change state so that it remains in its open state when no power is applied to it in its open state and it remains in its closed state when no power is applied to it in its closed state; [and]

F. a sensor circuit operable for sensing the presence of objects in a target region near the device oulet and for applying control signals to the *latching* valve to control flow of fluid through the conduit in response to at least one predetermined characteristic of the sensed object; *and*

G. *a battery for providing power to the electric valve and the sensor circuit, the sensor circuit, valve and battery being arranged, and/or the device comprising means, for limiting power requirements of at least one of the valve and sensor circuit so as to extend the life of the battery.*

38. *For controlling the flow of fluid through a faucet, a flow-control device comprising:*

A. *a housing sized to be supported by the faucet having a device inlet and a device outlet;*

B. *a fluid conduit disposed in the housing for conducting fluid from the inlet to the outlet;*

C. *mounting means on the housing for mounting the device on the faucet with the device inlet in fluid communication with the faucet outlet and the conduit disposed outside the faucet;*

D. *sealing means for sealing the device inlet to the faucet outlet when the mounting means mounts the housing on the faucet so that fluid can flow from the faucet only by flowing through the flow-control device;*

E. *an electric valve interposed in the conduit and operable by application of control signals thereto to switch between an open state, in which the valve permits fluid flow through the conduit, and a closed state, in which the valve prevents flow through the conduit;*

F. *a sensor circuit operable for sensing the presence of objects in a target region near the device and for applying control signals to the valve to control flow of fluid through the conduit in response to at least one predetermined characteristic of the sensed object;*

H. *a turbine disposed in the conduit for driving of the turbine by flow of water through the conduit; and*

I. *an electrical generator, connected to the turbine for driving thereby, for generating electric power when the turbine is driven by water flow, the generator being electrically connected to the sensor circuit to supply power thereto.*

39. *A flow-control device as defined in claim 38 wherein the valve is a latching valve, which requires power only to change state so that it remains in its open state when no power is applied to it in its open state and it remains in its closed state when no power is applied to it in its closed state.*

* * * * *